Dec. 2, 1941.    R. B. CAMPBELL    2,264,658
AIRCRAFT SUMP PUMP
Filed April 26, 1940
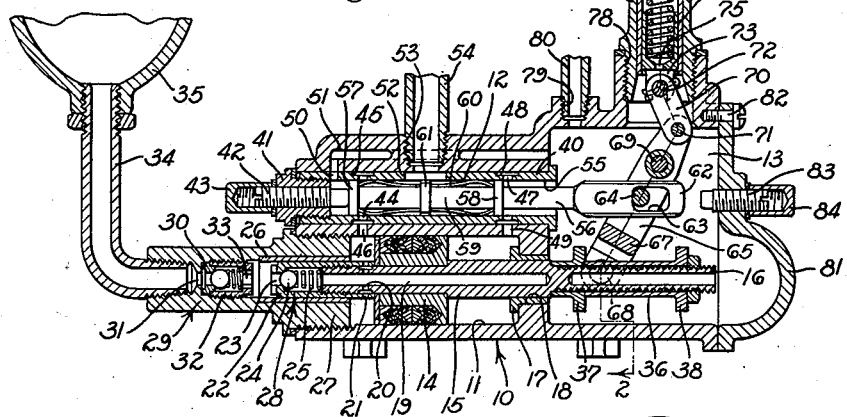
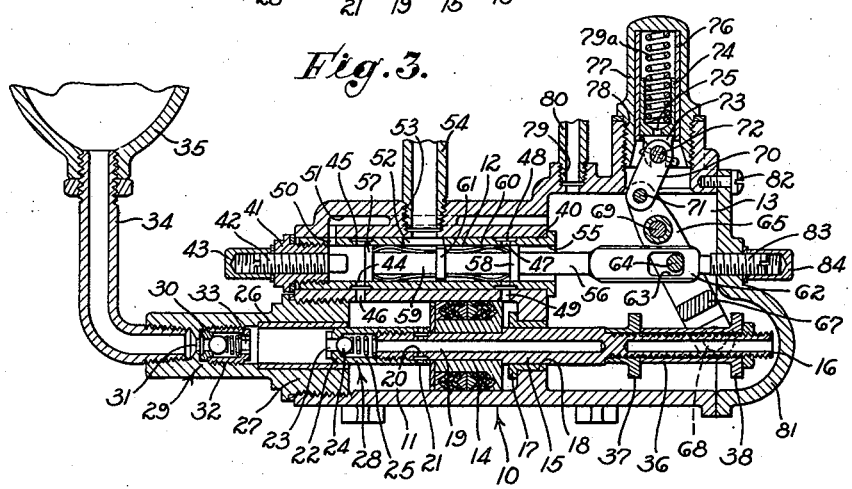
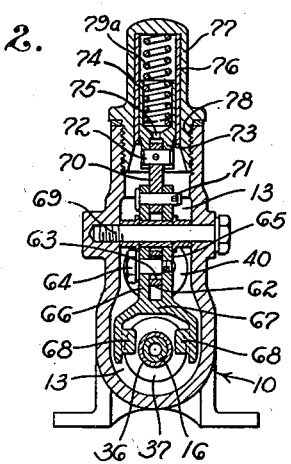
INVENTOR
RODNEY B. CAMPBELL
BY HARRIS, KIECH, FOSTER & HARRIS
ATTORNEYS.

Patented Dec. 2, 1941

2,264,658

UNITED STATES PATENT OFFICE 2,264,658

AIRCRAFT SUMP PUMP

Rodney B. Campbell, Los Angeles, Calif.

Application April 26, 1940, Serial No. 331,823

13 Claims. (Cl. 103—50)

My invention relates to pumping devices, and more particularly to a sump pump especially adapted for use in aircraft.

Although my invention is primarily designed for use in aircraft construction, it will be apparent that it may be used in other arts, and, therefore, although the invention is described in connection with such preferred use, it is to be understood that I do not intend to be limited to the embodiment shown and described.

It is now standard practice in the aircraft industry to utilize hydraulic control systems for actuating various mechanisms in aircraft, such systems ordinarily utilizing an operating fluid such as oil. It has been found that hydraulic controls for aircraft, regardless of how carefully made, have a tendency to leak, and the leakage therefrom frequently becomes a serious problem in that it depletes the hydraulic control system of its operating fluid, and at the same time may damage parts on which it leaks.

It is therefore a primary object of my invention to provide a hydraulic system for aircraft in which leakage from the system is collected in a suitable container and then returned to the system for further use. I prefer to accomplish this by providing a suitable collecting pan or sump in which such leakage is collected, and providing pumping mechanism adapted to pump the collected leakage fluid back into the hydraulic control system.

A further object of my invention is to provide a pumping device for such a hydraulic system, in which the operating fluid of the system is utilized to actuate the pump.

Still another object of my invention is to provide a pumping device for such a hydraulic system, which includes a main valve adapted to be operated by the pump, and having means for mechanically completing the throw of the valve in such a way that the rate of opening and closing of the valve ports is greatly increased.

Other objects and advantages will be apparent from the specification and the drawing, in which:

Fig. 1 is a vertical sectional view taken through my invention.

Fig. 2 is a sectional view taken on the line 2—2 of Fig. 1.

Fig. 3 is a vertical sectional view on the same plane as Fig. 1, but showing the valve mechanism in reversed position.

Referring to the drawing, I show a housing 10 having a piston cylinder 11, a valve cylinder 12, and a chamber 13 formed therein. Slidably disposed in the piston cylinder 11 is a piston 14 carried on a piston rod 15, the rightward end 16 of which projects through a flange 17 held in an opening 18 and into the chamber 13. The leftward end of the piston rod 15 is provided with a bore 19 which communicates laterally through openings 20 in the piston rod and ports 21 in a valve element 22 with the leftward end of the piston cylinder 11. The valve element 22 is suitably threaded onto the leftward end of the piston rod 15 and includes an axial passage 23 which communicates through the interior thereof with the bore 19, and which forms a valve seat on which is normally seated a ball valve member 24 normally held in seating position by a compression spring 25. As will be noted, the valve element 22 at all times extends into a liner sleeve 26 carried by a valve plug 27 threadedly received in the leftward end of the piston cylinder 11. The valve element 22 and the ball valve member 24 form a working valve means 28 in my invention. Also received in the valve plug 27 is a stationary valve means 29 which includes a valve seat element 30, the central opening of which is aligned with an opening 31 in the valve plug, and which is held in place by means of a threaded sleeve 32 having an apertured web 33. Threadedly received in the outer end of the valve plug 27 is a fluid conduit 34 leading to a fluid sump 35 of any suitable type well known in the art. The rightward end 16 of the piston rod 15 has threaded thereon a control sleeve 36 having flanges 37 and 38 formed thereon, for a purpose to be described hereinafter.

Received in the valve cylinder 12, and making a fluid-tight fit therewith, is a valve sleeve 40 held in place therein by an end plug 41 threadedly received in the valve sleeve, the end plug having an adjustment screw member 42 passing therethrough and into the valve cylinder 12, the adjustment screw member 42 having a dust cap 43 enclosing the outer end thereof. The valve sleeve 40 is provided with primary ports 44 communicating with a first annular channel 45 formed in the outer surface of the valve sleeve and which communicates through a primary opening 46 in the housing 10 with the leftward end of the piston cylinder 11. Also formed in the valve sleeve 40 are secondary ports 47 communicating with a second annular channel 48 also formed in the outer surface of the valve sleeve, and which communicates through a secondary opening 49 in the housing 10 with the rightward end of the piston cylinder 11. The leftward end of the valve cylinder 12 communicates through a port 50 in the valve sleeve 40 and a passage 51 in the housing 10 with the chamber 13. The valve sleeve 40 is also provided with an inlet port 52 which affords communication between the valve cylinder 12 and a threaded inlet opening 53 in which is threadedly received a high pressure conduit 54 adapted to carry operating fluid under relatively high pressure from a suitable source of supply (not shown).

The valve sleeve 40 is provided with a cylindrical bore 55 in which is disposed a tubular valve element 56 having a first head 57 and a second head 58, each of which makes a sliding fluid-tight fit with the cylindrical bore 55. The first head 57 and the second head 58 are spaced apart such a distance that when the valve element 56 is in the position shown in Fig. 1 the primary ports 44 are in direct communication with a central space 59 formed between the two heads, and the secondary ports 47 are in direct communication through the rightward end of the cylindrical bore 55 with the chamber 13. Fastened to the tubular valve element 56 in the central space 59 are a plurality of leaf springs 60 held thereto by means of a collar 61, the leaf springs acting to create a frictional drag between the tubular valve element 56 and the cylindrical bore 55 so as to prevent the tubular valve element from moving accidentally.

The rightward end of the tubular valve element 56 has formed thereon an actuating head member 62 which is provided with a rectangular slot 63 through which extends a bolt 64 held between opposing arms 65 and 66 of a yoke member 67, the lower legs of which span the control sleeve 36 and have lugs 68 thereon adapted to ride between the flanges 37 and 38 formed on the control sleeve. The yoke member 67 is pivotally mounted on a pin member 69 which extends between the opposing walls of the housing 10, as best shown in Fig. 2. Between the upper ends of the arms 65 and 66 is pivoted a link element 70 held thereto by means of a pivot pin 71, the upper end of the link element being also pivoted by a pivot pin 72 to a dog 73 depending from and formed integrally with a cup-shaped sleeve member 74 having an opening 75 in its lower end, the sleeve member being received in a liner sleeve 76 which is fitted into the bore of a threaded cap 77 received in a threaded opening 78 formed in the housing 10. The sleeve member 74 is normally urged downwardly by a compression spring 79a, one end of which is received in the sleeve member and the other end of which engages the cap 77. The housing 10 is also provided with a threaded discharge opening 79 which is adapted to receive a discharge pipe 80 which communicates therethrough from the chamber 13 to a reservoir or supply tank (not shown) adapted to lead the operating fluid back into the operating fluid system.

Closing the end of the chamber 13 is a cap plate 81 secured to the housing by any suitable means such as bolts 82, and extending through the cap plate is an adjustable stop screw 83, the outer end of which is covered by a cap 84 which may be removed to permit adjustment of the position of the stop screw.

In operation, the fluid sump 35 is placed beneath a point of leakage of operating fluid, such as oil, from a hydraulic system, and the leakage collects in the fluid sump. Operating fluid under high pressure is introduced into the housing 10 from the high pressure conduit 54 and flows through the inlet port 52 into the central space 59 between the first and second heads 57 and 58 of the valve element 56. With the parts in the positions shown in Fig. 1, the operating fluid under high pressure then flows through the primary ports 44 into the first annular channel 45, from whence it flows through the primary opening 46 into the leftward end of the piston cylinder 11. The operating fluid in the leftward end of the piston cylinder 11 then exerts a force on the piston 14 tending to move the same to the right from the position shown in Fig. 1. When the parts are in this position, it will be noted that the secondary opening 49 communicates through the rightward end of the cylindrical bore 55 with the chamber 13 and consequently with the discharge opening 79 and the discharge pipe 80 received therein. It will thus be understood that fluid ahead of the piston 14 may discharge at low pressure directly into the discharge pipe 80 to be conveyed by it to a suitable reservoir for return to the operating fluid system from which the fluid has originally come.

As the piston 14 moves to the right from the position shown in Fig. 1, the ball valve member 24 of the working valve means 28 remains seated on its seat, creating a partial vacuum therebehind which opens the stationary valve means 29 and thus draws fluid which has collected in the fluid sump 35 through the fluid conduit 34 into the space between the stationary valve means 29 and the working valve means 28.

Rightward movement of the piston 14 causes a corresponding movement of the piston rod 15, and engagement of the flange 37 with the lugs 68 on the yoke member 67 causes the yoke member to rotate on the pin member 69 in a counter-clockwise direction, as seen in Fig. 1. Rotation of the yoke member 67 likewise rotates the link element 70 to move the cup-shaped sleeve member 74 upwardly into the liner sleeve 76 against the action of the compression spring 79a therein. Continued movement of the piston 14 thus continues the rotation of the yoke member 67, and the bolt 64 soon engages the rightward end of the slot 63 of the actuating head member 62, preferably when the yoke member is substantially vertical, to cause the actuating head member 62 to start to move to the right, carrying with it the tubular valve element 56. As soon as the yoke member 67 passes the vertical or dead center position in its counter-clockwise rotation, the stored energy of the compression spring operating through the link element 70 causes the yoke member to finish its counter-clockwise movement free of the action of the flange 37 and at a rapid rate, the same causing the actuating head member 62 to be snapped to the right into engagement with the adjustable stop screw 83 and thus completing the movement of the tubular valve element 56 from the position shown in Fig. 1 to the position shown in Fig. 3.

In the position shown in Fig. 3, the first head 57 of the tubular valve element 56 has moved to the right so as to cut off communication between the central space 59 and the primary ports 44, at the same time opening communication between the central space and the secondary ports 47. Operating fluid under high pressure then flows from the central space 59 through the secondary ports 47 and the second annular channel 48 through the secondary opening 49 into the rightward end of the piston cylinder 11, to exert a leftward acting force on the piston 14 tending to move it to the left from the position shown in Fig. 3 to the position shown in Fig. 1. In this position, the leftward end of the piston cylinder 11 communicates through the primary opening 46, the first annular channel 45, and the primary ports 44 with the leftward end of the cylindrical bore 55, through which it communicates through the port 50 and the passage 51 with the chamber 13 and consequently with the discharge pipe 80, so that as the piston 14 moves to the left the fluid ahead of the piston may be discharged through the discharge pipe 80.

As the piston 14 moves to the left from the position shown in Fig. 3 to the position shown in Fig. 1, the working valve means 28 is likewise moved to the left, and fluid from the fluid sump 35 is trapped between the stationary valve means 29 and the working valve means 28, causing the ball valve member 24 of the working valve means to move off its seat in the valve element 22, thus permitting the fluid from the sump 35 to discharge therethrough and through the bore 19 and the openings 20 and ports 21 into the leftward end of the piston cylinder, from whence it can discharge with the exhausted operating fluid as explained.

When the piston 14 starts its movement to the left, the flange 38 of the control sleeve 36 engages the yoke member 67 to rotate the same in a clockwise direction. Upon continued rotation of the yoke member 67, the bolt 64 engages the leftward end of the slot 63, preferably when the yoke member is again substantially vertical, thus starting the movement of the tubular valve element 56 to the left, which is completed as hereinabove described, but in the reverse direction, by the force exerted by the compression spring 79a through the link element 70 on the yoke member 67.

It will thus be understood that the piston 14 will continue to be reciprocated as long as operating fluid under pressure is supplied to the housing through the high pressure conduit 54, and the device will continue to pump fluid which is collected in the fluid sump 35 therefrom and back into a suitable reservoir or return line. It will also be understood that by adjustment of the position of the adjustment screw member 42 and the adjustable stop screw 83, one of which is adapted to engage the first head 57 and the other the end of the actuating head member 62, the throw of the tubular valve 56 may be controlled within limits as desired.

Although I have shown and described a preferred embodiment of my invention, it will be understood that I do not intend to be limited thereby but desire to be accorded the full scope and protection of the following claims.

I claim as my invention:

1. In a device of the character described, the combination of: a housing having a piston cylinder and a valve cylinder and providing a control chamber; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending through one end of said piston cylinder and into said chamber; valve means in said valve cylinder adapted to be moved between two positions to alternately direct operating fluid under pressure into opposite ends of said piston cylinder; actuating means operatively connected to said valve means and extending into said chamber; spring actuated means in said chamber operatively connecting said piston rod means and said actuating means, and operable in response to movement of said piston means to move said valve means between said two positions; and a fluid outlet communicating with the interior of said chamber and adapted to convey therefrom fluid pumped into said chamber by said pump.

2. In a device of the character described, the combination of: a housing having a piston cylinder and a valve cylinder and providing a control chamber; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending through one end of said piston cylinder and into said chamber; valve means in said valve cylinder adapted to be moved between two positions to alternately direct operating fluid under pressure into opposite ends of said piston cylinder; actuating means operatively connected to said valve means and extending into said chamber; lever means in said chamber operatively connecting said piston rod means and said actuating means so that movement of said piston rod means initially moves said lever means; resilient means adapted to complete the movement of said lever means to complete the movement of said valve means between said two positions; and a fluid outlet communicating with the interior of said chamber and adapted to convey therefrom fluid pumped into said chamber by said pump.

3. In a device of the character described, the combination of: a housing having a piston cylinder and a valve cylinder and providing a control chamber; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending through one end of said piston cylinder and into said chamber; valve means in said valve cylinder adapted to be moved between two positions to alternately direct operating fluid under pressure into opposite ends of said piston cylinder; actuating means operatively connected to said valve means and extending into said chamber; pivoted lever means in said chamber operatively connecting said piston rod means and said actuating means so that movement of said piston rod means initially moves said lever means; linkage means connected to said lever means; spring means operatively connected to said linkage means so as to exert spring pressure through said linkage means on said lever means after initial movement thereof tending to complete the movement thereof to complete the movement of said valve means between said two positions; and a fluid outlet communicating with the interior of said chamber and adapted to convey therefrom fluid pumped into said chamber by said pump.

4. In a device of the character described, the combination of: a housing having a piston cylinder and a valve cylinder and providing a control chamber; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending into said chamber; valve means in said valve cylinder adapted to be moved between two positions to alternately direct operating fluid under pressure to opposite ends of said piston cylinder; a pivoted lever in said chamber operatively connecting said piston rod means and said valve means so that movement of said piston rod means rotates said lever to move said valve means, said lever having a free end; a link in said chamber having one end pivoted to said free end; compression spring means connected to the other end of said link; and a fluid outlet communicating with the interior of said chamber and adapted to convey therefrom fluid pumped into said chamber by said pump.

5. In a device of the character described, the combination of: a housing having a piston cylinder and a valve cylinder and providing a control chamber; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending into said chamber; valve means in said valve cylinder adapted to be moved between two positions to alternately direct operating fluid under pressure to opposite ends of said piston cylinder; a pivoted lever in said chamber operatively connecting said piston rod means and said valve means so that initial rotation of said lever does not move said valve means but so that upon continued rotation of said lever said valve means is moved thereby, said lever having a free end; a link in said chamber having one end pivoted to said free end; vertical compression spring means pivoted to the other end of said link so that rotation of said link towards a position of alignment with said spring means will compress said spring means; and a fluid outlet communicating with the interior of said chamber and adapted to convey therefrom fluid pumped into said chamber by said pump.

6. In a device of the character described, the combination of: a housing having a piston cylinder and a valve cylinder and providing a control chamber, there being a fluid discharge port communicating between said chamber and the exterior of said housing; piston means in said piston cylinder adapted to be reciprocated by operating fluid under pressure alternately admitted to opposite ends of said cylinder; pump means operatively connected to said piston means and adapted to be actuated by reciprocation of said piston means to pump a fluid into said chamber through passage means communicating between said pump means and said chamber; piston rod means operatively connected to said piston means and extending through one end of said piston cylinder and into said chamber; valve means in said valve cylinder adapted to be moved between two positions to alternately direct operating fluid under pressure into opposite ends of said piston cylinder; actuating means operatively connected to said valve means and extending into said chamber; spring actuated means in said chamber operatively connecting said piston rod means and said actuating means, and operable in response to movement of said piston means to move said valve means between said two positions; and adjustable stop means for limiting the amount of movement of said valve means, said stop means being adjustable from the exterior of said housing.

7. In a device of the character described, the combination of: a housing having a valve bore and a piston cylinder bore therein, one end of each of said bores being open to the exterior of said housing; a supply inlet in said housing communicating with said valve bore and adapted to be connected to a source of fluid under pressure; an outlet in said housing communicating with said valve bore; port means connecting said valve bore and each end of said piston cylinder bore; reciprocable piston means in said piston cylinder bore; reciprocable valve means in said valve bore adapted to alternately connect each end of said piston means with said supply inlet and said outlet through said port means; plug means for closing said one end of said piston cylinder bore, including a pump inlet; pump means carried by said plug means and said piston means and adapted to pump a fluid from said pump inlet into said one end of said piston cylinder bore in response to reciprocation of said piston means; passage means communicating between said one end of said piston cylinder bore and said outlet for conveying pumped fluid; closure means for closing said one end of said valve bore; and means for reciprocating said valve means in response to movement of said piston means.

8. In a device of the character described, the combination of: a housing having a valve bore and a piston cylinder bore therein, one end of each of said bores being open to the exterior of said housing; a supply inlet in said housing communicating with said valve bore and adapted to be connected to a source of fluid under pressure; an outlet in said housing communicating with said valve bore; port means connecting said valve bore and each end of said piston cylinder bore; reciprocable piston means in said piston cylinder bore; reciprocable valve means in said valve bore adapted to alternately connect each end of said piston means with said supply inlet and said outlet through said port means; plug means for closing said one end of said piston cylinder bore, including a pump inlet; pump means including an inwardly opening standing valve carried by said plug means and an inwardly opening travelling valve carried by said piston means, and adapted to pump a fluid from said pump inlet into said one end of said piston cylinder bore in response to reciprocation of said piston means; passage means communicating between said one end of said piston cylinder bore and said outlet for conveying pumped fluid; closure means for closing said one end of said valve bore; and means for reciprocating said valve means in response to movement of said piston means.

9. In a device of the character described, the combination of: a housing having a valve bore and a piston cylinder bore therein, one end of each of said bores being open to the exterior of said housing; a supply inlet in said housing communicating with said valve bore and adapted to be connected to a source of fluid under pressure; an outlet in said housing communicating with said valve bore; port means connecting said valve bore and each end of said piston cylinder bore; reciprocable piston means in said piston cylinder bore; reciprocable valve means in said valve bore adapted to alternately connect each end of said piston means with said supply inlet and said outlet through said port means; plug means for closing said one end of said piston cylinder bore, including a pump inlet; pump means carried by said plug means and said piston means and adapted to pump a fluid from said pump inlet into said one end of said piston cylinder bore in response to reciprocation of said piston means; passage means communicating between said one end of said piston cylinder bore and said outlet for conveying pumped fluid; closure means for closing said one end of said valve bore; first adjustable stop means carried by said closure means for adjustably limiting axial movement of said valve means in one direction; second adjustable stop means mounted on said housing for adjustably limiting axial movement of said valve means in the other direction, both of said stop means being adjustable from the exterior of said housing; and means for reciprocating said valve means in response to movement of said piston means.

10. In a device of the character described, the combination of: a housing having a valve bore and a piston cylinder bore therein, one end of each of said bores being open to the exterior of said housing, said housing also having a chamber therein with which said bores are axially aligned, said chamber being open on one side of said housing; a supply inlet in said housing communicating with said valve bore and adapted to be connected to a source of fluid under pressure; an outlet in said housing communicating with said chamber; port means connecting said valve bore and each end of said piston cylinder bore; reciprocable piston means in said piston cylinder bore; reciprocable valve means in said valve bore adapted to alternately connect each end of said piston means with said supply inlet and said chamber through said port means; plug means for closing said one end of said piston cylinder bore, including a pump inlet; pump means carried by said plug means and said piston means and adapted to pump a fluid from said pump inlet into said one end of said piston cylinder bore in response to reciprocation of said piston means; passage means communicating between said one end of said piston cylinder bore and said chamber for conveying pumped fluid; closure means for closing said one end of said valve bore; means for closing said open side of said chamber; and means for reciprocating said valve means in response to movement of said piston means, including a piston rod connected to said piston means and extending into said chamber, actuating means connected to said valve means and extending into said chamber, and linkage means in said chamber operatively connecting said piston rod and said actuating means.

11. In a device of the character described, the combination of: a housing having a valve bore and a piston cylinder bore therein, one end of each of said bores being open to the exterior of said housing; a supply inlet in said housing communicating with said valve bore and adapted to be connected to a source of fluid under pressure; an outlet in said housing communicating with said valve bore; port means connecting said valve bore and each end of said piston cylinder bore; reciprocable piston means in said piston cylinder bore, said piston means being removable from said bore through said one end thereof; reciprocable valve means in said valve bore adapted to alternately connect each end of said piston means with said supply inlet and said outlet through said port means; plug means for closing said one end of said piston cylinder bore, including a pump inlet; pump means adapted to pump a fluid from said pump inlet into said one end of said piston cylinder bore in response to reciprocation of said piston means, said pump means including an inwardly opening standing valve carried by said plug means and removable from said housing therewith, and an inwardly opening travelling valve carried by said piston means and removable from said housing therewith through said piston cylinder bore; passage means communicating between said one end of said piston cylinder bore and said outlet for conveying pumped fluid; closure means for closing said one end of said valve bore; and means for reciprocating said valve means in response to movement of said piston means.

12. In a device of the character described, the combination of: a housing having a valve bore and a piston cylinder bore therein, one end of each of said bores being open to the exterior of said housing; a supply inlet in said housing communicating with said valve bore and adapted to be connected to a source of fluid under pressure; an outlet in said housing communicating with said valve bore; port means connecting said valve bore and each end of said piston cylinder bore; reciprocable piston means in said piston cylinder bore; reciprocable valve means in said valve bore adapted to alternately connect each end of said piston means with said supply inlet and said outlet through said port means; plug means for closing said one end of said piston cylinder bore, including a pump inlet; pump means carried by said plug means and said piston means and adapted to pump a fluid from said pump inlet into said one end of said piston cylinder bore in response to reciprocation of said piston means; passage means communicating between said one end of said piston cylinder bore and said outlet for conveying pumped fluid; closure means for closing said one end of said valve bore; means for reciprocating said valve means in response to movement of said piston means; and means for materially accelerating the rate of end movement of said valve means in both directions.

13. In a device of the character described, the combination of: a housing having a valve bore and a piston cylinder bore therein, one end of each of said bores being open to the exterior of said housing, said housing also having a chamber therein with which said bores are axially aligned, said chamber having a side thereof open to the exterior of said housing; a supply inlet in said housing communicating with said valve bore and adapted to be connected to a source of fluid under pressure; an outlet in said housing communicating with said chamber; port means connecting said valve bore and each end of said piston cylinder bore; reciprocable piston means in said piston cylinder bore, said piston means being removable from said bore through said one end thereof; reciprocable valve means in said valve bore adapted to alternately connect each end of said piston means with said supply inlet and said chamber through said port means; plug means for closing said one end of said piston cylinder bore, including a pump inlet; pump means adapted to pump a fluid from said pump inlet into said one end of said piston cylinder bore in response to reciprocation of said piston means, said pump means including an inwardly opening standing valve carried by said plug means and removable from said housing therewith, and an inwardly opening travelling valve carried by said piston means and removable from said housing therewith through said piston cylinder bore; passage means communicating between said one end of said piston cylinder bore and said chamber for conveying pumped fluid; closure means for closing said one end of said valve bore; first adjustable stop means carried by said closure means for adjustably limiting axial movement of said valve means in one direction; means for closing said open side of said chamber having second adjustable stop means carried thereby for adjustably limiting axial movement of said valve means in the other direction, both said stop means being adjustable from the exterior of said housing; and means for reciprocating said valve means in response to movement of said piston means, including a piston rod connected to said piston means and extending into said chamber, actuating means connected to said valve means and extending into said chamber, and linkage means in said chamber operatively connecting said piston rod and said actuating means.

RODNEY B. CAMPBELL.